(12) United States Patent
Li et al.

(10) Patent No.: US 11,626,220 B2
(45) Date of Patent: Apr. 11, 2023

(54) SURFACE-MOUNTABLE OVER-CURRENT PROTECTION DEVICE

(71) Applicant: Polytronics Technology Corp., Hsinchu (TW)

(72) Inventors: Feng Ji Li, Taoyuan (TW); Yi-Hsuan Lee, Taichung (TW); Yung Hsien Chang, Douliu (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 5 days.

(21) Appl. No.: 17/471,795

(22) Filed: Sep. 10, 2021

(65) Prior Publication Data
US 2022/0399141 A1   Dec. 15, 2022
US 2022/0399141 A1   Dec. 15, 2022

(30) Foreign Application Priority Data

Jun. 10, 2021   (TW) .................. 110121150

(51) Int. Cl.
*H01C 7/02*   (2006.01)
*H01C 1/14*   (2006.01)

(52) U.S. Cl.
CPC .......... *H01C 7/021* (2013.01); *H01C 1/1406* (2013.01)

(58) Field of Classification Search
CPC .............................. H01C 7/021; H01C 1/1406
See application file for complete search history.

(56) References Cited

U.S. PATENT DOCUMENTS

| 4,972,067 A * | 11/1990 | Lokar ............... H05B 3/14 219/505 |
| 8,933,775 B2 * | 1/2015 | Wang .............. H01C 7/027 338/13 |
| 9,997,906 B1 * | 6/2018 | Yen .............. H01C 17/06586 |
| 2011/0012706 A1 * | 1/2011 | Hyde ................ H01B 17/525 338/53 |
| 2014/0146432 A1 * | 5/2014 | Wang .............. H01C 7/027 361/93.7 |
| 2015/0155080 A1 * | 6/2015 | Chu ............... H01C 1/1406 338/22 R |

* cited by examiner

*Primary Examiner* — Kyung S Lee
(74) *Attorney, Agent, or Firm* — Muncy, Geissler, Olds & Lowe, P.C.

(57) ABSTRACT

A surface-mountable over-current protection device comprises at least one PTC material layer, a first conductive layer, a second conductive layer, a first electrode, a second electrode, an insulating layer, and a cover layer. The PTC material layer comprises crystalline polymer and conductive fillers dispersed therein. The first conductive layer and the second conductive layer are disposed on a first surface and a second surface of the PTC material layer, respectively. The first electrode and the second electrode are electrically connected to the first conductive layer and the second conductive layer, respectively. The insulating layer is disposed between the first electrode and the second electrode for insulation. The cover layer includes a fluorine-containing polymer, and wraps around an entire outer surface of the surface-mountable over-current protection device.

18 Claims, 5 Drawing Sheets

SURFACE-MOUNTABLE OVER-CURRENT PROTECTION DEVICE

BACKGROUND OF THE INVENTION

(1) Field of the Invention

The present application relates to a surface-mountable over-current protection device, and more specifically, to a surface-mountable over-current protection device with superior resistance repeatability.

(2) Description of the Related Art

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperatures, so that the circuit or cell can operate normally. However, when an over-current or an over-temperature event occurs in the circuit or cell, the resistance will instantaneously increase to a high resistance state (e.g. at least above $10^4 \Omega$), which is the so-called trip. Therefore, the over-current will be eliminated so as to protect the cell or the circuit device.

A known PTC material usually uses carbon black as conductive filler which is evenly dispersed in crystalline polymer. In this crystalline structure, the carbon black particles are usually aligned at grain boundaries and are arranged closely. Accordingly, current can flow through the insulating crystalline polymer through such "carbon black chains." At normal temperatures such as room temperature, numerous carbon chains exist in the polymer and constitute conductive paths.

When the current makes the temperature of device increase to a temperature exceeding the phase transition temperature such as the melting point of the polymer, the polymer expands to change the crystalline state to amorphous state. As such, the carbon chains are broken and thus current is not allowed to pass therethrough, and as a consequence, the resistance increases instantaneously. The phenomenon of instant increase of resistance is the so-called "trip."

When the temperature decreases to below the phase transition temperature, the polymer is re-crystallized and the conductive carbon black chains are rebuilt. However, the polymer cannot be fully recovered after expansion so that the carbon chains cannot sustain original conductivity and the resistance cannot return to initial low resistance. After tripping many times, the resistance may increase significantly, resulting in poor resistance recovery or poor resistance repeatability.

Traditionally, to solve the problem of poor resistance recovery or repeatability, one solution is provided by forming an epoxy encapsulation layer around the surface-mountable over-current protection device, wherein the epoxy encapsulation layer is the material like or similar to those conventionally used to encapsulate electronic devices, so as to avoid water and oxygen entering the device or influencing electrical properties of the device. However, electronic apparatuses are being made smaller as time goes on. Therefore, it is required to extremely restrict the sizes or thicknesses of active and passive devices. If an epoxy encapsulation layer is formed around the surface-mountable over-current protection device, the epoxy encapsulation layer will have a thickness of at least 2 mm. Such an encapsulation layer having a thick thickness is not suitable for small-sized surface-mountable over-current protection device. In addition, after encapsulation, the epoxy encapsulation layer will cover the external electrodes at upper or lower surfaces and the conductive through-holes at side surfaces (e.g., the connecting conductors 12 and 12' in FIG. 2), and as a consequence, the surface-mountable over-current protection device cannot be welded to a protective circuit module (PCM) or a circuit board, and the solder wicking phenomenon along the conductive through-holes at side surfaces during solder reflowing process cannot be established. Apparently, epoxy polymer serving as an encapsulation material cannot be applied to the small-sized surface-mountable over-current protection device. Even if there might be a process where the epoxy encapsulation layer can be formed and be prevented from covering the external electrodes at upper or lower surfaces and the conductive through-holes at side surfaces, it is predictable that such a process requires a quite high manufacturing cost.

Furthermore, in terms of water and oxygen blocking ability, epoxy material cannot be satisfied in many applications. Therefore, there is a need to provide an encapsulation material formed on outer surface of the surface-mountable over-current protection device in which the encapsulation material makes the device have a superior resistance recovery and/or resistance repeatability.

SUMMARY OF THE INVENTION

To solve aforementioned problems, the present invention provides a surface-mountable over-current protection device with a cover layer wrapping around an entire outer surface of the device. The cover layer can block water and oxygen entering the device. Because the cover layer is very thin in thickness, the surface-mountable over-current protection device is particularly suitable in applications for small-sized electronic products. Also, weldability of the device on PCM or circuit board is not affected by the cover layer at all. The surface-mountable over-current protection device of the present invention has a superior resistance recovery, and an excellent trip or endurable current per unit area of the device.

In accordance with an aspect of the present application, the present application provides a surface-mountable over-current protection device comprising at least one PTC material layer, a first conductive layer, a second conductive layer, a first electrode, a second electrode, at least one insulating layer, and a cover layer. The PTC material layer has opposite first and second planar surfaces, and comprises crystalline polymer and conductive filler dispersed therein. The first conductive layer is disposed on the first surface. The second conductive layer is disposed on the second surface. The first electrode electrically connects to the first conductive layer. The second electrode electrically connects to the second conductive layer. The at least one insulating layer is disposed between the first and second electrodes to electrically isolate the first electrode from the second electrode. The cover layer comprises a fluorine-containing polymer, and wraps around an entire outer surface of the surface-mountable over-current protection device. The cover layer has a thickness of $10^2$-$10^3$ nm. The surface-mountable over-current protection device has a resistance recovery $R_{o_{\%}}$ of 0.85-1.20 and a trip current per unit area of the device of 0.65-0.80 A/mm$^2$ after 336 hours in high temperature and high humidity environment.

In an embodiment, the surface-mountable over-current protection device of Claim 1, wherein the crystalline polymer comprises high-density polyethylene, medium-density polyethylene, low-density polyethylene, polyethylene wax, vinyl polymer, polypropylene, polyvinyl chloride, polyvinyl fluoride, copolymer of ethylene and acrylic acid, copolymer of ethylene and acrylic resin, copolymer of olefin monomer and vinyl alcohol monomer, or the combination thereof.

In an embodiment, the conductive filler comprises carbon black, nickel, cobalt, copper, iron, tin, lead, silver, gold, platinum, titanium carbide, tungsten carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, or the mixture, alloy, solid solution or core-shell thereof.

In an embodiment, the PTC material layer further comprises non-conductive filler selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide or the combination thereof.

In an embodiment, the first or second conductive layer is copper foil, nickel foil or nickel-plated copper foil.

In an embodiment, the first or second conductive layer comprises conductive material or conductive composite material formed by electroplating, electrolysis, deposition or film-thickening process.

In an embodiment, the insulating layer comprises epoxy resin containing glass fiber.

In an embodiment, the PTC material layer, the first conductive layer, the second conductive layer, the first electrode and the second electrode layer are laminated, and the first and second conductive layers are inner circuits in comparison with adjacent first and second electrodes.

In an embodiment, the surface-mountable over-current protection device further comprises a first connecting conductor and a second connecting conductor. The first connecting conductor comprises a conductive through hole, conductive blind hole or a conductive side surface and extends vertically to connect the first electrode and the first conductive layer. The second connecting conductor comprises a conductive through hole, conductive blind hole or a conductive side surface and extends vertically to connect the second electrode and the second conductive layer.

In an embodiment, two insulating layers are disposed on the first and second conductive layers, respectively.

In an embodiment, the first electrode comprises a pair of first electrode layers disposed on the two insulating layers, and the second electrode comprises a pair of second electrode layers disposed on the two insulating layers.

In an embodiment, the fluorine-containing polymer is fluoroaliphatic polymer, fluorine-containing ethylene copolymer, fluorine-containing ethylene-vinyl ether copolymer, fluorocarbon polymer, or any mixtures thereof.

In an embodiment, the fluorine-containing polymer can be dissolved in the fluorinated ether organic solvent.

In an embodiment, the fluorinated ether organic solvent is ethyl nonafluoroisobutyl ether, ethyl nonafluorobutyl ether, methyl nonafluoroisobutyl ether, methyl nonafluorobutyl ether, or any mixtures thereof.

In an embodiment, the cover layer further comprises a nano-filler material, and the nano-filler material is montmorillonite, silicon dioxide, aluminum dioxide, or any mixtures thereof.

In an embodiment, after being put in a high temperature and high humidity environment 40° C./95% for 336 hours, the surface-mountable over-current protection device has a resistance recovery $R_{o\%}$ of 1.10-1.20 and a trip current per unit area of the device of 0.65-0.75 A/mm².

In an embodiment, after being put in a high temperature and high humidity environment 65° C./90% for 336 hours, the surface-mountable over-current protection device has a resistance recovery $R_{o\%}$ of 1.00-1.10 and a trip current per unit area of the device of 0.65-0.75 A/mm².

In an embodiment, after being put in a high temperature and high humidity environment 85° C./85% for 336 hours, the surface-mountable over-current protection device has a resistance recovery $R_{o\%}$ of 0.85-1.00 and a trip current per unit area of the device of 0.75-0.80 A/mm².

The surface-mountable over-current protection device of the present invention uses a cover layer with very thin thickness to cover an entire outer surface of the device, thus being particularly suitable in applications for small-sized electronic products. The cover layer can avoid water and oxygen entering the device, therefore the device has a superior resistance recovery and an excellent trip or endurable current per unit area of the device. In the meanwhile, the cover layer does not affect weldability of the device on PCM or circuit board at all.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

According to the present invention, a cover layer is used to wrap around an entire outer surface (i.e., all exterior surfaces) of a surface-mountable over-current protection device. The cover layer includes a fluorine-containing polymer which avoids water and oxygen entering the device. Accordingly, the device has a superior resistance recovery, thereby increasing endurable current (A/mm²).

The surface-mountable over-current protection devices in which the present invention could be applied may have different structures, including Patent No. TW1441200 with a filing date of Sep. 6, 2012, Patent No. TWI433169 with a filing date of Apr. 1, 2014, and Patent No. TWI581274 with a filing date of Jul. 29, 2016 in which all filed by the applicant of the present invention are incorporated herein for reference. However, the devices are not limited thereto. Any types of surface-mountable over-current protection devices are covered and protected by the present application. FIGS. 1-10 show surface-mountable over-current protection devices having different structures and thus being used as examples to illustrate the inventive concept of the present invention.

Figure 1:
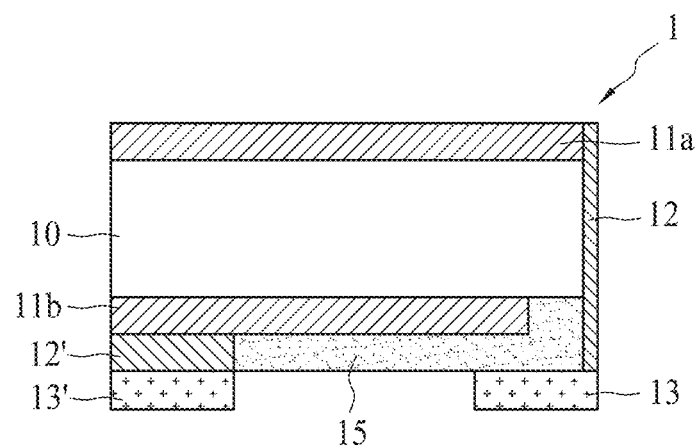
FIGS. 1 to 8 show surface-mountable over-current protection devices in accordance with first to eight embodiments of the present application.

FIG. 1 illustrates a surface-mountable over-current protection device 1 in accordance with a first embodiment of the present application, which is suitable to adhere to a substrate or a circuit board (not shown). A first electrode 13 and a second electrode 13' corresponding to the first electrode 13 are usually located on a same plane. The surface-mountable over-current protection device 1 can be designed to contain only one electrode set comprising the first electrode 13 and the second electrode 13' such that only one surface thereof could adhere to the substrate. The design in FIG. 1 is usually applied to a narrow space and meets the requirements of one-way heat conduction or one-way heat insulation. In the embodiment, the first electrode 13, a connecting conductor 12, a first conductive layer 11a, a PTC material layer 10, a second conductive layer 11b, a connecting conductor 12', and the second electrode 13' form a conductive circuit to connect an external device (not shown) and a power source (not shown). In addition, an insulating layer 15 is disposed between the first electrode 13 and second electrode 13' to electrically insulate the first electrode 13 from the second electrode 13'. The connecting conductor 12 may be conductive plated through hole or wrap-around conductive side surface.

Figure 2:
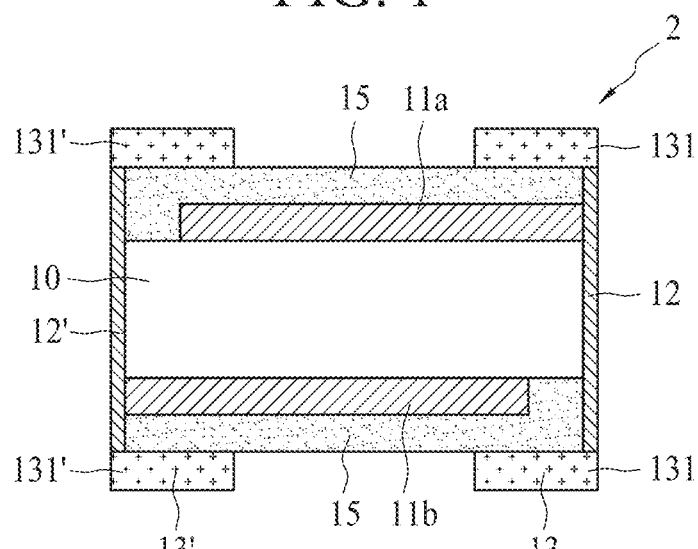

FIG. 2 illustrates a surface-mountable over-current protection device 2 in accordance with a second embodiment of the present application, which is designed to contain two electrode sets, each comprising the first electrode 13 and the second electrode 13' on the top surface thereof and the bottom surface thereof, respectively. Thus, the first and second electrodes 13 and 13' form a positive electrode and a negative electrode at the top surface and the bottom surface of the surface-mountable over-current protection device 2 such that either of the top and the bottom surfaces could be used to adhere to the substrate or circuit board. Therefore, there is no up-down direction concern in the design, and the manufacturing process (e.g., the selection of resistors, device packaging, device assembly and the manufacturing process of the printed circuit board) is simplified. Similar to the first embodiment, the second embodiment employs insulating layers 15 to electrically insulate the first electrode 13 from the second electrode 13'. More specifically, the first conductive layer 11a and the second conductive layer 11b are disposed on the upper and the lower surfaces of the PTC material layer 10, respectively. In other words, the PTC material layer 10 is disposed between the first and second conductive layers 11a and 11b. The first electrode 13 comprises a pair of first electrode layers 131 at the upper and lower surfaces of the device 2, and the second electrode 13' comprises a pair of second electrode layers 131' at the upper and lower surfaces of the device 2. The first electrode layers 131 and the second electrode layers 131' are formed on the insulating layers 15. The first connecting conductor 12 connects to the pair of first electrode layers 131 and the first conductive layer 11a, whereas the second connecting conductor 12' connects to the pair of second electrode layers 131' and the second conductive layer 11b. The PTC material layer 10, the first conductive layer 11a, the second conductive layer 11b, the first electrode 13 and the second electrode 13' are laminated. The first conductive layer 11a is viewed as an inner circuit in comparison with adjacent first electrode 13 and the second electrode 13', i.e., the upper electrode layers 131 and 131'. Likewise, the second conductive layer 11b is viewed as an inner circuit in comparison with adjacent second electrode 13 and the second electrode 13', i.e., the lower electrode layers 131 and 131'.

Figure 3:
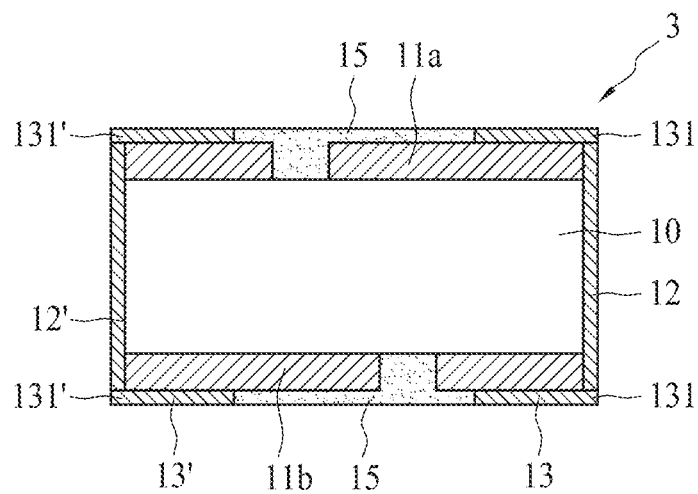

FIG. 3 illustrates a surface-mountable over-current protection device 3 in accordance with a third embodiment of the present application, in which the first connecting conductor 12 and the second connecting conductor 12' may be formed by metallic electroplating on side surfaces of the surface-mountable over-current protection device 3 to form wrap-around electrical conductors. The first connecting conductor 12 connects to the first conductive layer 11a and the pair of first electrode layers 131, and the second connecting conductor 12' connects to the second conductor layer 11b and the pair of the second electrode layers 131'. In this embodiment, the upper first electrode layer 131 is in physical contact with the first conductive layer 11a, whereas the lower second electrode layer 131' is in physical contact with the second conductive layer 11b. In addition, the first and the second connecting conductors 12 and 12' may connect to the first and the second conductive layers 11a and 11b and electrodes 13 and 13' by soldering, electroplating and reflowing, or curing. In the current embodiment, the first and the second connecting conductors 12 and 12' can be formed by first forming micro holes, followed by electroplating the holes to form plating-through-holes or metal filling process to form conductive posts.

Figure 4:
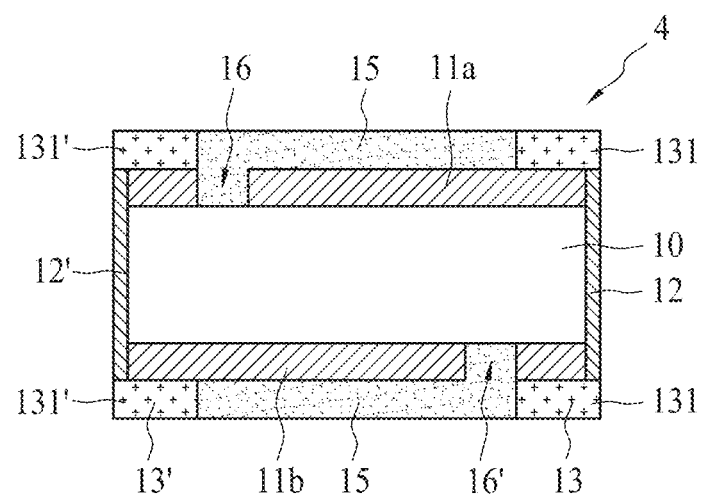

FIG. 4 illustrates a surface-mountable over-current protection device 4 in accordance with a fourth embodiment of the present application. The first electrode 13 comprises a pair of first electrode layers 131, and the second electrode 13' comprises a pair of second electrode layers 131'. A first connecting conductor 12 connects to the pair of the first electrode layers 131 and the first conductive layer 11a, whereas a second connecting conductor 12' connects to the pair of the second electrode layers 131' and the second conductive layer 11b. The first conductive layer 11a is formed by etching and is electrically insulated from the second electrode 13' and the second connecting conductor 12' by an etching line or etching area 16. Similarly, the second conductive layer 11b is formed by etching and is electrically insulated from the first electrode 13 and the first connecting conductor 12 by an etching line or etching area 16'.

Figure 5:
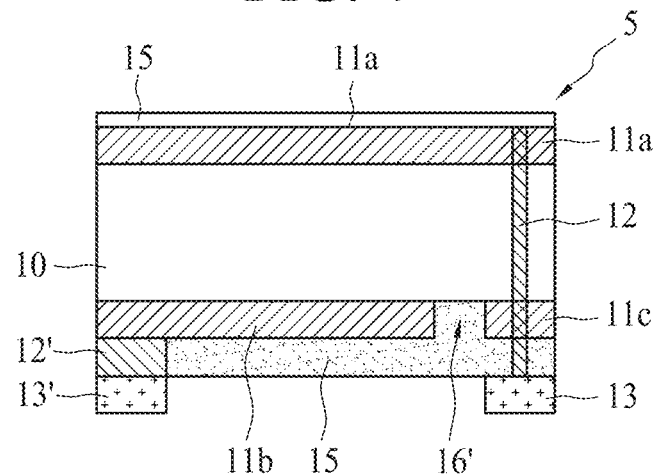

FIG. 5 illustrates a surface-mountable over-current protection device 5 in accordance with a fifth embodiment of the present application. Like the device 1 shown in FIG. 1, the device 5 relates to a SMD-type (surface mount device) over-current protection device with a single-side electrode. The first connecting conductor 12, e.g., a conductive plated-through-hole or conductive post, electrically connects to a first conductive layer 11a, a third conductive layer 11c and a first electrode 13. The third conductive layer 11c is formed by etching and is electrically insulated from the second conductive layer 11b by an etching line or etching area 16'. More specifically, the third conductive layer 11c, which adheres to the PTC material layer 10, and the second conductive layer 11b are located on a same plane. In an embodiment, the first conductive layer 11a is overlaid by a thin insulating layer 15 such as insulating paint or text ink.

Figure 6:
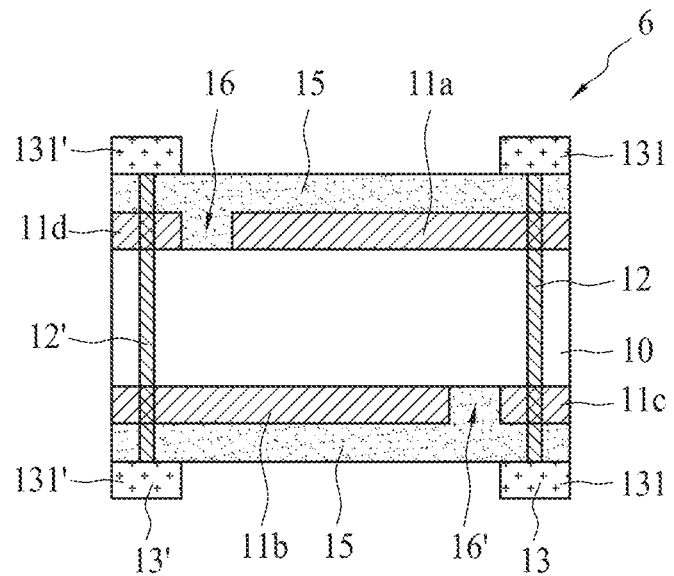

FIG. 6 illustrates a surface-mountable over-current protection device 6 in accordance with a sixth embodiment of the present application. The first electrode 13 comprises a pair of first electrode layers 131 at the upper and lower surfaces of the device 6, and the second electrode 13' comprises a pair of second electrode layers 131' at the upper and lower surfaces of the device 6. A first connecting conductor 12, e.g., a conductive plated-through-hole or a conductive post, electrically connects to the first electrode layer 131, a first conductive layer 11a and a third conductive layer 11c. The third conductive layer 11c is formed by etching and is electrically insulated from a second conductive layer 11b by an etching line or etching area 16'. A second connecting conductor 12', e.g., a conductive plated-through-hole or a conductive post, electrically connects to the second electrode layer 131', a second conductive layer 11b and a fourth conductive layer 11d. The fourth conductive layer 11d is formed by etching and is electrically insulated from a first conductive layer 11a by an etching line or etching area 16. The fourth conductive layer 11d adheres to the PTC material layer 10, and the first and fourth conductive layers 11a and 11d are on a same plane.

Figure 7:
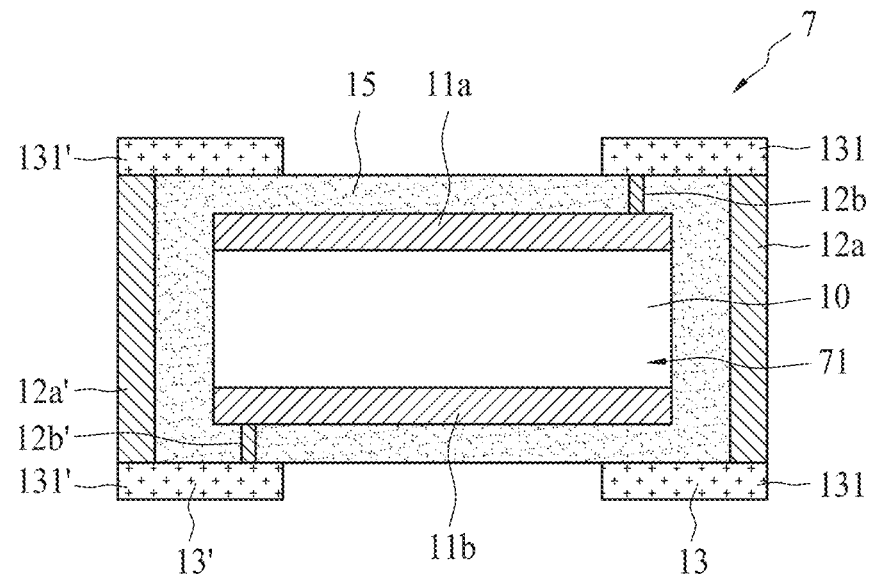

FIG. 7 illustrates a surface-mountable over-current protection device 7 in accordance with a seventh embodiment of the present application. The over-current protection device 7 comprises a PTC device 71, a first connecting conductor 12a, a second connecting conductor 12a', a first electrode 13 and a second electrode 13'. The PTC device 71 comprises a first conductive layer 11a, a second conductive layer 11b and a PTC material layer 10 laminated therebetween. The first electrode 13 comprises a pair of first electrode layers 131 at the upper and lower surfaces of the device 7, and the second electrode 13' comprises a pair of second electrode layers 131' at the upper and lower surfaces of the device 7. An insulating layer 15 encompasses the PTC device 7. The connecting conductor 12a, e.g., a conductive plated-through-hole or a conductive side surface, connects to the pair of first electrode layers 131. The connecting conductor 12b, e.g., a conductive plated-through-hole or a conductive post, connects to conductive layer 11a and the upper electrode layer 131. The connecting conductor 12a', e.g., a conductive plated-through-hole or a conductive side surface, connects to the pair of second electrode layers 131'. The connecting conductor 12b', e.g., a conductive-through-hole or a conductive post, connects to conductive layer 11b and the lower electrode layer 131'.

Figure 8:
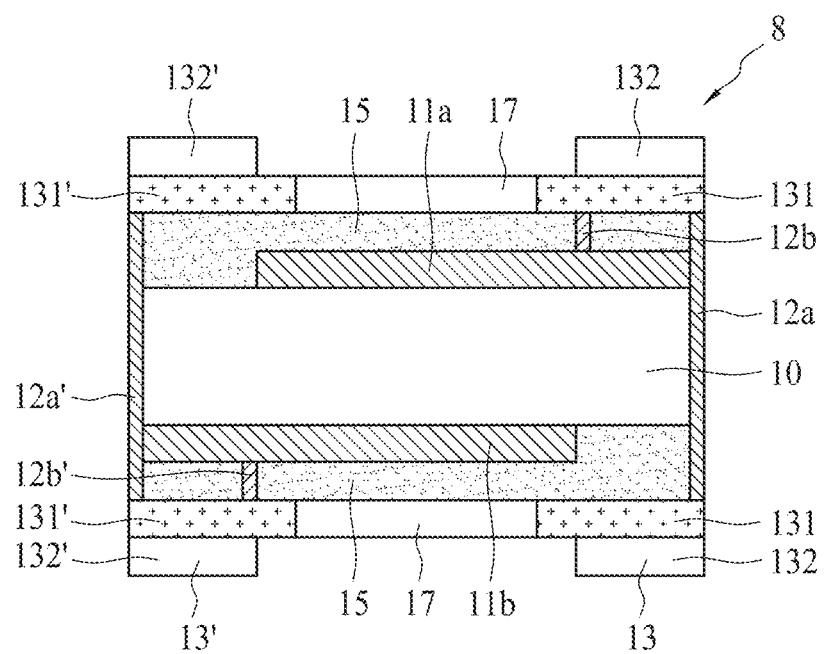

FIG. 8 illustrates a surface-mountable over-current protection device 8 in accordance with an eighth embodiment of the present application. The device 8 is similar to the structure shown in FIG. 2 except the device 8 further comprises a connecting conductor 12b connecting to the upper electrode layer 131 and the first conductive layer 11a, and a connecting conductor 12b' connecting to the lower electrode layer 131' and the second conductive layer 11b, thereby increasing heat transfer or heat dissipation efficiency. Moreover, if the electrode layers 131 and 131' are copper layers, they may be preferably combined with tin layers 132 and 132' for easy soldering. A solder mask 17 may be formed between the first electrode layer 131 and the second electrode layer 131' at the upper or lower surface.

An exemplary manufacturing process of the surface-mountable over-current protection device is described below. The people having ordinary knowledge can apply equivalent or similar processes to the aforesaid surface-mountable over-current protection devices or the like.

The manufacturing of the surface-mountable over-current protection device of the present invention is given as follows. The raw material is set into a blender (Haake-600) at 160° C. for 2 minutes. The procedures of feeding the material are as follows: The crystalline polymer with a certain amount is first loaded into the Haake blender till the polymer is fully melted. The conductive fillers (e.g., nickel powder, titanium carbide, tungsten carbide or carbon black) and/or the non-conductive fillers (e.g., magnesium hydroxide) are then added into the blender. The rotational speed of the blender is set to 40 rpm. After blending for three minutes, the rotational speed increases to 70 rpm. After blending for seven minutes, the mixture in the blender is drained and thereby forming a conductive composition with a positive temperature coefficient behavior. Afterwards, the above conductive composition is loaded into a mold to form a symmetrical PTC lamination structure with the following layers: steel plate/Teflon cloth/PTC compound (i.e., the conductive composition)/Teflon cloth/steel plate. First, the mold loaded with the conductive composition is pre-pressed for 3 minutes at 50 kg/cm$^2$ and 160° C. This pre-press process can exhaust the gas generated from vaporized moisture or from some volatile ingredients in the PTC lamination structure. The pre-press process could also drive the air pockets out from the PTC lamination structure. As the generated gas is exhausted, the mold is pressed for additional 3 minutes at 100 kg/cm$^2$ and 160° C. After that, the press step is repeated once at 150 kg/cm$^2$, 160° C. for 3 minutes to form a PTC composite material layer.

Figure 9A:
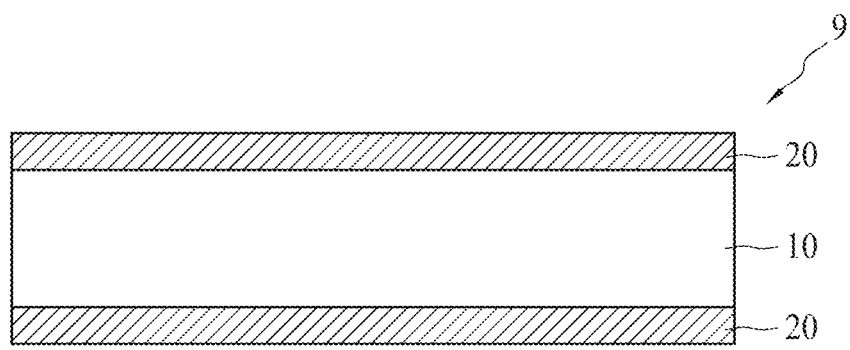
FIGS. 9A to 9C show a process of making the over-current protection device in accordance with an embodiment of the present application.

Referring to FIG. 9A, the PTC composite material layer is cut to form plural PTC material layers 10, each with a size of 20×20 cm$^2$, and two metal foils 20 physically contact the top surface and the bottom surface of the PTC material layer 10, in which the two metal foils 20 are symmetrically placed upon the top surface and the bottom surface of the PTC material layer 10. Each metal foil 20 may have a rough surface with plural nodules (not shown) to physically contact the PTC material layer 10. The metal foil 20 may have two smooth surfaces, but it usually contains one rough surface and one smooth surface in which the rough surface having nodules is in physical contact with the PTC material layer 10. Next, two Teflon cloths (not shown) are placed upon the two metal foils 20, and two steel plates (not shown) are placed upon the two Teflon cloths. All the Teflon cloths and the steel plates are disposed symmetrically on the top and the bottom surfaces of the PTC material layer 10 to form a multi-layered structure. The multi-layered structure is then pressed for 3 minutes at 60 kg/cm$^2$ and 180° C., and is then pressed at the same pressure at room temperature for 5 minutes. After the steps of pressing, the multi-layered structure is subjected to a gamma-ray radiation of 50 KGy to form a conductive composite module 9, as shown in FIG. 9A.

Figure 9B:
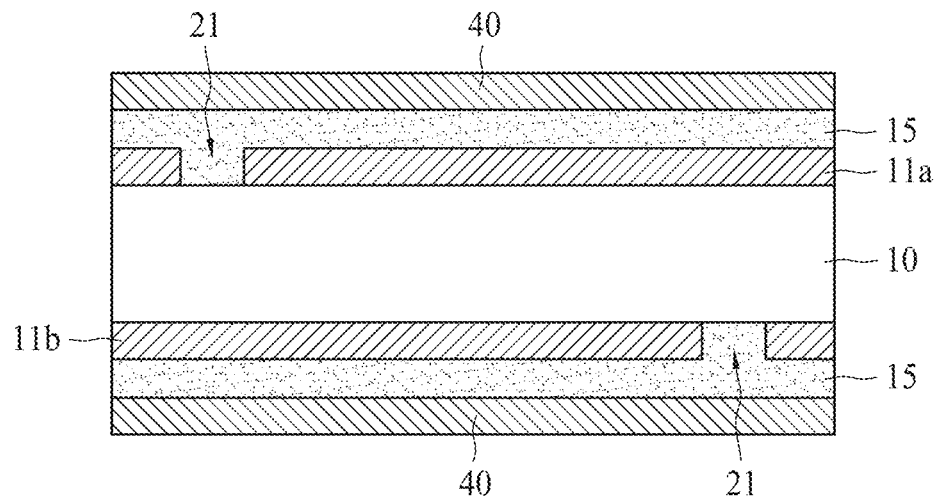

In an embodiment, the metal foils 20 of the above conductive composite module 9 are etched to form two etching lines 21 (refer to FIG. 9B) to form a first conductive layer 11a on a surface of the PTC material layer 10 and a second conductive layer 11b on another surface of the PTC material layer 10. Then, insulating layers 15, which may contain the epoxy resin of glass fiber, are disposed on the first and the second conductive layers 11a and 11b, and then copper foils 40 are formed thereon. Again, a hot-press is performed at 60 kg/cm$^2$ and 180° C. for 30 minutes so as to form a composite material layer comprising one PTC material layer 10 as shown in FIG. 9B.

Figure 9C:
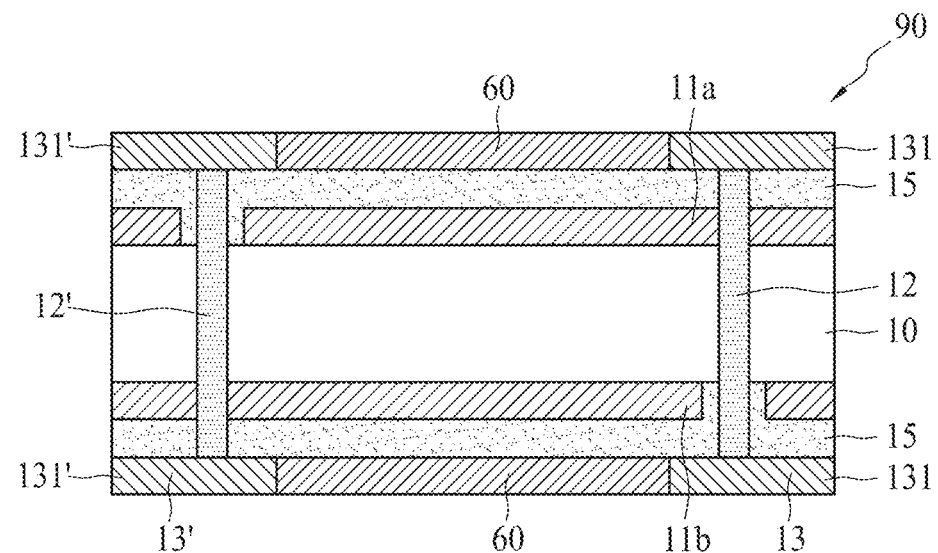

Referring to FIG. 9C, the upper and lower copper foils 40 are etched to form a pair of first electrode layers 131 and a pair of second electrode layers 131' corresponding to the first electrode layers 131. A first connecting conductor 12 and a second connecting conductor 12' are formed by drilling holes and electroplating to form plating-through-holes (PTH). The first electrode 13 comprises the pair of the first electrode layers 131, whereas the second electrode 13' comprises the pair of the second electrode layers 131'. The first connecting conductor 12 electrically connects the first conductive layer 11a and the first electrode layers 131, and the second connecting conductor 12' electrically connects the second conductive layer 11b and the second electrode layers 131'. Subsequently, insulating layers 60 or the so-called solder masks containing UV-light-curing paint are disposed between the first electrode 13 and the second electrode 13' for insulation, thereby forming a PTC plate. After curing by UV light, the PTC plate is cut according to the size of the device, so as to form SMD over-current protection devices 90.

In addition to the example comprising a single PTC material layer 10, the present application comprises other embodiments containing more PTC material layers 10.

Figure 10:
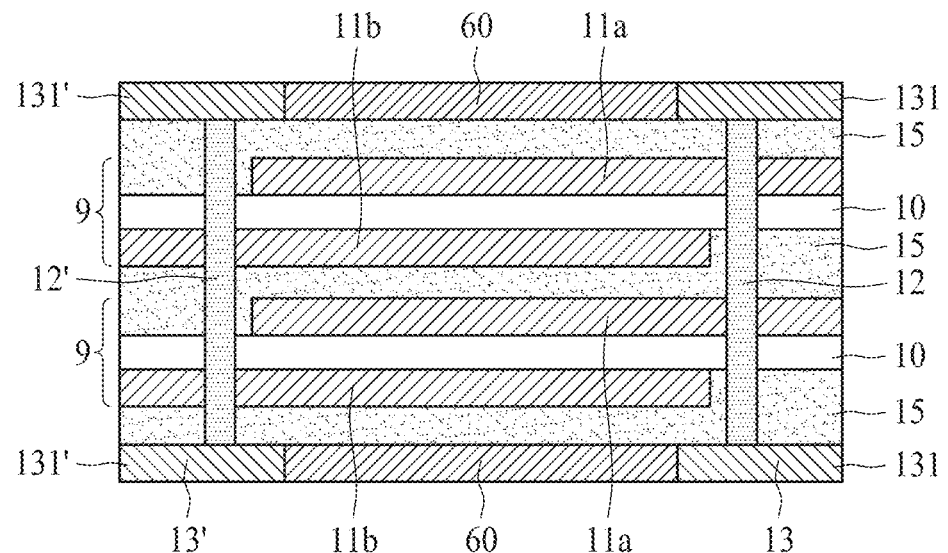
FIG. 10 shows a surface-mountable over-current protection device having two PTC material layers in accordance with another embodiment of the present application.

FIG. 10 illustrates a surface-mountable over-current protection device comprising two PTC material layers 10. The manufacturing method is given as follows. Two conductive composite modules 9 are provided first. Second, the conductive layers 11a and 11b of each conductive composite module 9 are etched to form etching lines. Third, insulating layers 15, which may use the epoxy resin containing glass fiber, are disposed on the conductive layers 11a and 11b and between the two conductive composite modules 9. Then, a copper foil is placed on the top surface of the upper insulating layer 15 and another copper foil is disposed on the bottom surface of the lower insulating layer 15, followed by hot pressing at 60 kg/cm$^2$ and 180° C. for 30 minutes. After cooling, a multi-layered composite material layer comprising two PTC material layers 10 is formed. Next, the copper foils on the insulating layers 15 are etched to from a pair of first electrode layers 131 and a pair of second electrode layers 131' corresponding to the first electrode layers 131. The first electrode 13 comprises the pair of the first electrode layers 131, and the second electrode 13' comprises the pair of the second electrode layers 131'. After that, connecting conductors 12 and 12', e.g., plating-through-holes, are formed, in which the connecting conductor 12 electrically connects to the conductive layers 11a of the conductive composite modules 9 and the first electrode layers 131, and the second connecting conductor 12' electrically connects to the conductive layers 11b of the conductive composite modules 9 and the second electrode layers 131'. Afterward, insulating layers or solder masks 60, e.g., UV-light-curing paint, are disposed between the first electrodes 13 and the second electrodes 13' for insulation, thereby forming a multi-layer PTC plate. After UV-curing, the multi-layer PTC plate is cut according to the size of the device to form the SMD over-current protection device comprising multiple PTC material layers 10 or multiple PTC devices 9.

The PTC material layer 10 comprises crystalline polymer and conductive filler dispersed therein. The crystalline polymer may be polyolefines (e.g., high-density polyethylene (HDPE), medium-density polyethylene, low-density polyethylene (LDPE), polyvinyl wax, vinyl polymer, polypropylene, polyvinyl chloride and polyvinyl fluoride), copolymer of olefin monomer and acrylic monomer (e.g., copolymer of ethylene and acrylic acid or copolymer of ethylene and acrylic resin) or copolymer of olefin monomer and vinyl alcohol monomer (e.g., copolymer of ethylene and vinyl alcohol), and may include one or more crystalline polymer materials.

In the application of over-charge protection to lithium-ion batteries, to achieve protection at low temperature, a general PTC over-current protection device must trip at a lower temperature. Therefore, the PTC material layer used in the surface-mountable over-current protection device of the present application contains a crystalline polymer with a lower melting point (e.g., LDPE), or can use one or more crystalline polymers in which at least one crystalline polymer has a melting point below 115° C. The above LDPE can be polymerized using Ziegler-Natta catalyst, Metallocene catalyst or other catalysts, or can be copolymerized by vinyl monomer or other monomers such as butane, hexane, octene, acrylic acid, or vinyl acetate. Sometimes, to achieve protection at high temperature or a specific objective, the compositions of the PTC material layer may totally or partially use crystalline polymer with high melting point; e.g., polyvinylidene fluoride (PVDF), polyvinyl fluoride (PVF), polytetrafluoroethylene (PTFE), or polychlorotrifluoro-ethylene (PCTFE).

The above crystalline polymers can also comprise a functional group such as an acidic group, an acid anhydride group, a halide group, an amine group, an unsaturated group, an epoxide group, an alcohol group, an amide group, a metallic ion, an ester group, and acrylate group, or a salt group. In addition, an antioxidant, a cross-linking agent, a flame retardant, a water repellent, or an arc-controlling agent can be added into the PTC material layer to improve the material polarity, electric property, mechanical bonding property or other properties such as waterproofing, high-temperature resistance, cross-linking, and oxidation resistance.

The conductive filler may comprise carbon black, metal powder or conductive ceramic powder. If the conductive filler is a metal powder, it could be nickel, cobalt, copper, iron, tin, lead, silver, gold, platinum, or an alloy thereof. If the conductive filler is a conductive ceramic powder, it could be titanium carbide (TiC), tungsten carbide (WC), vanadium carbide (VC), zirconium carbide (ZrC), niobium carbide (NbC), tantalum carbide (TaC), molybdenum carbide (MoC), hafnium carbide (HfC), titanium boride (TiB2), vanadium boride (VB2), zirconium boride (ZrB2), niobium boride (NbB2), molybdenum boride (MoB2), hafnium boride (HfB2), or zirconium nitride (ZrN). The conductive filler may be mixture, alloy, solid solution or core-shell structure of the aforesaid metal powders or conductive ceramic fillers.

The metal powder or the conductive ceramic powder used in the present application could exhibit various types, e.g., spherical, cubic, flake, polygonal, spiky, rod, coral, nodular, staphylococcus, mushroom or filament type, and has aspect ratio between 1 and 1000. The conductive filler may be of high structure or low structure. In general, conductive filler with high structure can improve the resistance repeatability of PTC material, and conductive filler with low structure can improve the voltage endurance of PTC material.

The PTC material layer 10 may further comprise a non-conductive filler to increase voltage endurance. The non-conductive filler of the present invention is selected from: (1) an inorganic compound with the effects of flame retardant and anti-arcing; for example, zinc oxide, antimony oxide, aluminum oxide, silicon oxide, calcium carbonate, boron nitride, aluminum nitride, magnesium sulfate and barium sulfate and (2) an inorganic compound with a hydroxyl group; for example, magnesium hydroxide, aluminum hydroxide, calcium hydroxide, and barium hydroxide. The non-conductive filler of organic compound is capable of decreasing resistance jump.

The conductive layers 11a and 11b may be metal foils such as copper foils, nickel foils or nickel-plated copper foils. The conductive layers 11a and 11b may comprise conductive material or conductive composite material formed by electroplating, electrolysis, deposition or film-thickening process.

The connecting conductors 12, 12', 12a and 12a' are usually made of metal, and can be in the shape of cylinder, semicircular cylinder, elliptic cylinder, semi-elliptic cylinder, plane or sheet. The connecting conductor 12, 12', 12a or 12a' can be formed in a via, a blind via, or wraps around a full sidewall surface or a part of the sidewall surface, so as to form a conductive through hole, a conductive blind hole or a conductive side surface. As to the SMD over-current protection device having single-side electrode, the most upper conductive layer on the PTC material layer can be fully exposed or only covered by a thin insulating layer such as insulating paint or text ink.

The insulating layers 15 may be composite material comprising epoxy resin and glass fiber, which can be adhesive for jointing the PTC material layers 10 and the conductive layers. In addition to epoxy resin, other insulating adhesives like nylon, polyvinylacetate, polyester or polyimide can be used alternatively. The insulating layers 60 may be acrylic resins subjected to thermal curing or UV-light curing.

Figure 11:
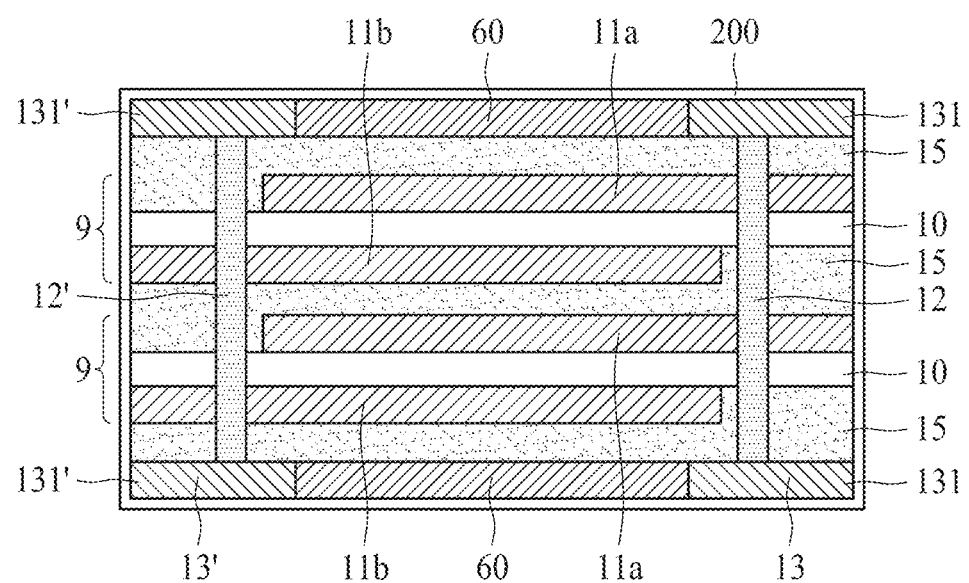
FIG. 11 shows a surface-mountable over-current protection device of FIG. 10 that is covered by a cover layer on the device's entire outer surface in accordance with an embodiment of the present application.

To verify resistance recovery of a surface-mountable over-current protection device where a cover layer wraps around an entire outer surface of the device, Table 1 shows the composition to form a PTC material layer 10 and a conductive composite module 9 by volume percentages in accordance with Embodiments (E1-E2) of the present application and Comparative Examples (C1-C2). Two conductive composite modules 9 are hot-pressed to form the surface-mountable over-current protection device comprising two PTC material layers 10, as shown in FIG. 10. The surface-mountable over-current protection device has a top-view area of 12 mil×6 mil which could be converted to "mm", and the device comprises two PTC material layers 10. Therefore, the effective area for current flowing therethrough upon calculation is 3 mm×1.5 mm×2=9.0 mm². The crystalline polymer uses high-density polyethylene (HDPE), and the conductive filler evenly dispersed in the polymer uses tungsten carbide (WC). For E1 and E2, the surface-mountable over-current protection device comprising two PTC material layers is immersed into a fluorine-containing polymer solution for about 1 second first, and is immediately taken out to air-dry at room temperature, thereby a cover layer 200 can be formed to wrap around the entire outer surface of the device, as shown in FIG. 11. In E1 and E2, the fluorine-containing polymer solution includes fluoroaliphatic polymer and ethyl nonafluoroisobutyl ether, wherein fluoroaliphatic polymer comprising 10% by weight of the solution and ethyl nonafluoroisobutyl ether comprising 90% by weight of the solution. As to C1 and C2, the surface-mountable over-current protection device does not undergo an encapsulation wrap-around step, therefore the device does not include an encapsulation material layer or a cover layer that is formed on an outer surface of the device. In practice, regarding composition of the PTC material layer, HDPE may comprise 50-60% by volume of the PTC material layer, and tungsten carbide (WC) may comprise 40-50% by volume of the PTC material layer.

TABLE 1

| | HDPE (vol %) | WC (vol %) |
|---|---|---|
| E1 | 55.0 | 45.0 |
| E2 | 53.7 | 46.3 |
| C1 | 55.0 | 45.0 |
| C2 | 53.7 | 46.3 |

In an embodiment, the fluorine-containing polymer solution of the present invention includes a fluorine-containing polymer and a fluorinated ether organic solvent which comprise 10-20% and 80-90% by weight of the solution, respectively. The fluorine-containing polymer can be dissolved in the fluorinated ether organic solvent. The fluorine-containing polymer could be one of fluoroaliphatic polymer, fluorine-containing ethylene copolymer, fluorine-containing ethylene-vinyl ether copolymer, fluorocarbon polymer, or any mixtures thereof. The fluorinated ether organic solvent could be one of ethyl nonafluoroisobutyl ether, ethyl nonafluorobutyl ether, methyl nonafluoroisobutyl ether, methyl nonafluorobutyl ether, or any mixtures thereof.

In another embodiment, the fluorine-containing polymer solution further includes a nano-filler material. The nano-filler material functions to avoid water and oxygen entering the surface-mountable over-current protection device as well. The nano-filler material could be one of montmorillonite, silicon dioxide, aluminum dioxide, or any mixtures thereof. However, because the nano-filler material cannot be dissolved in the fluorinated ether organic solvent, the nano-filler material comprises only a small amount of the fluorine-containing polymer solution. In this embodiment, the fluorine-containing polymer, the fluorinated ether organic solvent, and the nano-filler material comprise 10-20%, 70-90% and 0-10% by weight of the solution, respectively.

As described above, in E1 and E2, the cover layer will wrap around entire outer surface of the surface-mountable over-current protection device. However, the fluorine-containing polymer does not have a large amount of weight percentage in the fluorine-containing polymer solution, and the solvent included in the solution is volatile at room temperature. Therefore, once the solution is coated on entire outer surface of the device, the cover layer will be formed instantly after the solvent in the solution volatilizes or evaporates at room temperature, and the cover layer as formed has a quite thin thickness of $10^2$-$10^5$ nm, e.g. $10^3$ nm or $10^4$ nm. Moreover, because the fluorine atoms on the polymer chain of the fluorine-containing polymer are hydrophobic, the cover layer as formed can block water entering the device. On the other hand, because the cover layer has a certain thickness though it is thin, the cover layer can still function to block oxygen entering the device as well. In addition, the solder material commonly used in welding is usually made of tin or alloy thereof, and the reflow oven is controlled to have an interior reflow space having a high temperature (e.g. 150-300° C.) which is much higher than melting point of the solder material. Thus, when the surface-mountable over-current protection device is welded to the circuit board by reflowing, because of the solder material's properties and the so-formed structure of the cover layer, the solder material can easily permeate through the cover layer in such a high-temperature reflow environment. Accordingly, the cover layer covering the outer surface of the device would not affect weldability of the device on the circuit board at all. The cover layer does not affect the solder material to wick upwards along the conductive through-holes at side surfaces of the device either. In sum, in comparison with the traditional epoxy material serving as an encapsulation layer, the cover layer of the present invention has a thinner thickness, thus being particularly suitable for small-sized electronic products. In addition, not only can the cover layer avoid water and oxygen entering the device but surface mount technology (SMT) can be used to weld the device onto PCM or circuit board.

For each of E1-E2 and C1-C2, five surface-mountable over-current protection devices are taken as samples to perform the following measurements, wherein reflow are performed twice to weld the device onto the test board, and a thermal curing process is executed at 150° C. for 5 minutes for the assembly, thus making the device trip three times in order to simulate the scenario where the maximum number of tripping times of the devices intended to be welded onto PCM or circuit board by the clients: (1) initial resistance at room temperature, i.e., $R_{bf}$; (2) resistance after 96 hours in high temperature and high humidity environment 40° C./95%, i.e., R_96 hr@40° C./95%; (3) resistance after 336 hours in high temperature and high humidity environment 40° C./95%, i.e., R_336 hr@40° C./95%; and (4) trip current at 25° C. after 336 hours in high temperature and high humidity environment 40° C./95%, i.e., I-trip@25° C. These values are recorded in Table 2. See below. Moreover, a ratio of $R_{o\%}$=(R_336 hr@40° C./95%)/($R_{bf}$) is calculated. This ratio $R_{o\%}$ is defined as a resistance recovery which is used to evaluate resistance variation of device from $R_{bf}$ to R_336 hr@40° C./95%. Ideally, the smaller the resistance recovery is, the less the resistance of the device increases after being exposed to high temperature and high humidity environment 40° C./95% for 336 hours. In contrast, the larger the resistance recover is, the more the resistance of the device increases after being exposed to high temperature and high humidity environment 40° C./95% for 336 hours. In addition, a trip current per unit area of the device (A/mm²) can be calculated based on I-trip@25° C. and device area (i.e., 3 mm×1.5 mm×2=9.0 mm²). The trip current per unit area of the device (A/mm²) is equivalent to the endurable current per unit area of the device (A/mm²); that is, the trip current per unit area of the device is used to evaluate endurable current per unit area of the device. Taking E1 as an example, the trip current per unit area of the device at 25° C. (A/mm²)=I-trip@25° C./area=6.17/9.0=0.69.

TABLE 2

|  | $R_{bf}$ (Ω) | R_96 hr @ 40° C./ 95% (Ω) | R_336 hr @ 40° C./ 95% (Ω) | (R_336 hr @ 40° C./ 95%)/ ($R_{bf}$) | I-trip @ 25° C. (A) | I-trip @ 25° C./ area (A/mm²) |
|---|---|---|---|---|---|---|
| E1 | 0.00350 | 0.00383 | 0.00401 | 1.14571 | 6.17 | 0.69 |
| E2 | 0.00288 | 0.00318 | 0.00340 | 1.18056 | 6.70 | 0.74 |
| C1 | 0.00373 | 0.00477 | 0.00506 | 1.35657 | 5.21 | 0.58 |
| C2 | 0.00319 | 0.00410 | 0.00433 | 1.35737 | 5.41 | 0.60 |

E1 and C1 have the same composition, wherein the device of E1 includes a cover layer while the device of C1 does not. Therefore, the test results in this group of samples, i.e., E1 and C1, can be observed to show test result differences therebetween due to structure difference. From Table 2, it is shown that C1 has an initial resistance $R_b$ greater than that of E1. Also, C1 has a resistance R_96 hr@40° C./95% and a resistance R_336 hr@40° C./95% greater than those of E1. However, E1 has a resistance recovery $R_{o\%}$ less than that of C1, and its resistance recovery $R_{o\%}$ is more closed to value "1" than C1. Particularly, Table 1 reveals that the resistance of device of E1 increases 14.571% after 336 hours in high temperature and high humidity environment 40° C./95% from initial resistance $R_{bf}$, and the resistance of device of C1 increases 35.657% after 336 hours in high temperature and high humidity environment 40° C./95% from initial resistance $R_{bf}$. As to the trip current per unit area of the device at 25° C. (A/mm²), E1 has a value 0.69 greater than that (i.e., 0.58) of C1.

E2 and C2 have the same composition, wherein the device of E2 includes a cover layer while the device of C2 does not. The test results in this group are basically similar to those in the above group (i.e., E1 and C1).

Apparently, with a cover layer wrapping around an entire outer surface of the surface-mountable over-current protection device, water and oxygen can be blocked entering the device. Accordingly, the device has a lower value of initial resistance $R_{bf}$, has a superior resistance recovery, and does not have a high value of resistance after use for a period of time when compared to initial resistance $R_{bf}$, i.e. having a small extent of resistance variation. In addition, the device including a cover layer can endure higher current per unit area of the device.

In another experimental verification test, the high temperature and high humidity environment is changed from 40° C./95% to 65° C./90%. Likewise, resistances and trip currents are measured for the surface-mountable over-current protection devices of E1-E2 and C1-C2. The values thereof are recorded in Table 3. See below. Resistance recovery $R_{o\%}$ and the trip current per unit area of the device (A/mm²) are calculated as well.

TABLE 3

|  | $R_{bf}$ (Ω) | R_96 hr @ 65° C./ 90% (Ω) | R_336 hr @ 65° C./ 90% (Ω) | (R_336 hr @ 65° C./ 90%)/ ($R_{bf}$) | I-trip @ 25° C. (A) | I-trip @ 25° C./ area (A/mm²) |
|---|---|---|---|---|---|---|
| E1 | 0.00349 | 0.00348 | 0.00366 | 1.04871 | 6.19 | 0.69 |
| E2 | 0.00290 | 0.00296 | 0.00311 | 1.07241 | 6.48 | 0.72 |
| C1 | 0.00367 | 0.00445 | 0.00458 | 1.24796 | 5.45 | 0.61 |
| C2 | 0.00313 | 0.00365 | 0.00384 | 1.22684 | 5.69 | 0.63 |

Generally, Table 3 has the same test results as those in Table 2. In other words, with a cover layer wrapping around an entire outer surface of the surface-mountable over-current protection device, the device has a lower value of initial resistance $R_{bf}$, has a superior resistance recovery, and does not have a high value of resistance after use for a period of time when compared to initial resistance $R_{bf}$, i.e. having a small extent of resistance variation. In addition, the device including a cover layer can endure higher current per unit area of the device.

In yet another experimental verification test, the high temperature and high humidity environment is changed from 40° C./95% to 85° C./85%. Likewise, resistances and trip currents are measured for the surface-mountable over-current protection devices of E1-E2 and C1-C2. The values thereof are recorded in Table 4. See below. Resistance recovery $R_{o\%}$ and the trip current per unit area of the device (A/mm²) are calculated as well.

TABLE 4

|  | $R_{bf}$ (Ω) | R_96 hr @ 85° C./ 85% (Ω) | R_336 hr @ 85° C./ 85% (Ω) | (R_336 hr @ 85° C./ 85%)/ ($R_{bf}$) | I-trip @ 25° C. (A) | I-trip @ 25° C./ area (A/mm²) |
|---|---|---|---|---|---|---|
| E1 | 0.00356 | 0.00314 | 0.00319 | 0.89607 | 6.73 | 0.75 |
| E2 | 0.00286 | 0.00290 | 0.00277 | 0.96853 | 7.15 | 0.79 |
| C1 | 0.00379 | 0.00432 | 0.00533 | 1.40633 | 5.55 | 0.62 |
| C2 | 0.00313 | 0.00343 | 0.00417 | 1.33227 | 5.38 | 0.60 |

Generally, Table 4 has the same test results as those in Table 2. In other words, with a cover layer wrapping around an entire outer surface of the surface-mountable over-current protection device, the device has a lower value of initial resistance $R_{bf}$, has a superior resistance recovery, and does not have a high value of resistance after use for a period of time when compared to initial resistance $R_{bf}$, i.e. having a small extent of resistance variation. In addition, the device including a cover layer can endure higher current per unit area of the device.

In summary, a cover layer is used to wrap around an entire outer surface of the surface-mountable over-current protection device. A fluorine-containing polymer solution is coated on the entire outer surface of the device to form the cover layer. The fluorine-containing polymer solution includes a fluorine-containing polymer and a fluorinated ether organic solvent which comprise 10-20% and 80-90% by weight of the solution, respectively. Alternatively, the fluorine-containing polymer solution may comprise the fluorine-containing polymer, the fluorinated ether organic solvent, and a nano-filler material, which comprise 10-20%, 70-90% and 0-10% by weight of the solution, respectively. The fluorine-containing polymer can be dissolved in the fluorinated ether organic solvent. The cover layer as formed has a quite thin thickness of $10^2$-$10^5$ nm, e.g. $10^3$ nm or $10^4$ nm, thus being particularly suitable in applications for small-sized electronic products. In addition, surface mount technology (SMT) can be used to weld the device onto PCM or circuit board. Because the cover layer can avoid water and oxygen entering the device, the device has a superior resistance recovery $R_{o\%}$ and an excellent endurable current per unit area of the device (A/mm²). In particular, the device has a small extent of resistance variation after being put in high temperature and high humidity environment for 336 hours. For example, Table 2 shows that, after the device is put in high temperature and high humidity environment 40° C./90% for 336 hours, the resistance recover $R_{o\%}$ is 1.10-1.20, the trip or endurable current per unit area of the device is 0.65-0.75 A/mm². Table 3 shows that, after the device is put in high temperature and high humidity environment 65° C./90% for 336 hours, the resistance recovery $R_{o\%}$ is 1.00-1.10, the trip or endurable current per unit area of the device is 0.65-0.75 A/mm². Table 4 shows that, after the device is put in high temperature and high humidity environment 85° C./85% for 336 hours, the resistance recover $R_{o\%}$ is 0.85-1.00, the trip or endurable current per unit area of the device is 0.75-0.80 A/mm². Normally, the device in use will not be exposed to an environment having a temperature and a humidity that are more rigorous than those in Tables 1-3, therefore in real use, no matter what the temperature and the humidity of the environment are, the device would have a resistance recovery $R_{o\%}$ of 0.85-1.20 (e.g., 0.9, 1.0 or 1.10), and a trip or endurable current per unit area of the device of 0.65-0.80 A/mm² (e.g., 0.70 A/mm² or 0.75 A/mm²) after 336 hours in use.

The present invention provides a surface-mountable over-current protection device including a cover layer on an entire outer surface of the device. The cover layer can avoid water and oxygen entering the device, so that the device has a superior resistance recovery and an excellent trip or endurable current per unit area of the device. Moreover, since the cover layer has a quite thin thickness in nanometer scale, the device is particularly suitable in applications for small-sized electronic products. Furthermore, the cover layer covering the outer surface of the device does not affect weldability of the device on PCM or circuit board at all.

The above-described embodiments of the present invention are intended to be illustrative only. Numerous alternative embodiments may be devised by persons skilled in the art without departing from the scope of the following claims.

What is claimed is:

1. A surface-mountable over-current protection device, comprising:
   at least one PTC material layer having opposite first and second planar surfaces, and comprising crystalline polymer and conductive filler dispersed therein;
   a first conductive layer disposed on the first surface;
   a second conductive layer disposed on the second surface;
   a first electrode electrically connecting to the first conductive layer;
   a second electrode electrically connecting to the second conductive layer;
   at least one insulating layer disposed between the first and second electrodes to electrically isolate the first electrode from the second electrode; and
   a cover layer comprising a fluorine-containing polymer, and wrapping around an entire outer surface of the surface-mountable over-current protection device,
   wherein the cover layer has a thickness of $10^2$-$10^5$ nm; and
   wherein the surface-mountable over-current protection device has a resistance recovery $R_{o\%}$ of 0.85-1.20 after 336 hours in high temperature and high humidity environment.

2. The surface-mountable over-current protection device of claim 1, wherein the crystalline polymer comprises high-density polyethylene, medium-density polyethylene, low-density polyethylene, polyethylene wax, vinyl polymer, polypropylene, polyvinyl chloride, polyvinyl fluoride, copolymer of ethylene and acrylic acid, copolymer of ethylene and acrylic resin, copolymer of olefin monomer and vinyl alcohol monomer, or the combination thereof.

3. The surface-mountable over-current protection device of claim 1, wherein the conductive filler comprises carbon black, nickel, cobalt, copper, iron, tin, lead, silver, gold, platinum, titanium carbide, tungsten carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, or the mixture, alloy, solid solution or core-shell thereof.

4. The surface-mountable over-current protection device of claim 1, wherein the PTC material layer further comprises non-conductive filler selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide or the combination thereof.

5. The surface-mountable over-current protection device of claim 1, wherein the first or second conductive layer is copper foil, nickel foil or nickel-plated copper foil.

6. The surface-mountable over-current protection device of claim 1, wherein the first or second conductive layer comprises conductive material or conductive composite material formed by electroplating, electrolysis, deposition or film-thickening process.

7. The surface-mountable over-current protection device of claim 1, wherein the insulating layer comprises epoxy resin containing glass fiber.

8. The surface-mountable over-current protection device of claim 1, wherein the PTC material layer, the first conductive layer, the second conductive layer, the first electrode and the second electrode layer are laminated, and the first and second conductive layers are inner circuits in comparison with adjacent first and second electrodes.

9. The surface-mountable over-current protection device of claim 1, further comprising a first connecting conductor and a second connecting conductor; the first connecting conductor comprising a conductive through hole, conductive blind hole or a conductive side surface and extending vertically to connect the first electrode and the first conductive layer; the second connecting conductor comprising a conductive through hole, conductive blind hole or a conductive side surface and extending vertically to connect the second electrode and the second conductive layer.

10. The surface-mountable over-current protection device of claim 1, wherein two insulating layers are disposed on the first and second conductive layers, respectively.

11. The surface-mountable over-current protection device of claim 10, wherein the first electrode comprises a pair of first electrode layers disposed on the two insulating layers, and the second electrode comprises a pair of second electrode layers disposed on the two insulating layers.

12. The surface-mountable over-current protection device of claim 1, wherein the fluorine-containing polymer is fluoroaliphatic polymer, fluorine-containing ethylene copolymer, fluorine-containing ethylene-vinyl ether copolymer, fluorocarbon polymer, or any mixtures thereof.

13. The surface-mountable over-current protection device of claim 12, wherein the fluorine-containing polymer can be dissolved in the fluorinated ether organic solvent.

14. The surface-mountable over-current protection device of claim 13, wherein the fluorinated ether organic solvent is ethyl nonafluoroisobutyl ether, ethyl nonafluorobutyl ether, methyl nonafluoroisobutyl ether, methyl nonafluorobutyl ether, or any mixtures thereof.

15. The surface-mountable over-current protection device of claim 1, wherein the cover layer further comprises a nano-filler material, and the nano-filler material is montmorillonite, silicon dioxide, aluminum dioxide, or any mixtures thereof.

16. The surface-mountable over-current protection device of claim 1, wherein after being put in a high temperature and high humidity environment 40° C./95% for 336 hours, the surface-mountable over-current protection device has a resistance recovery $R_{o\%}$ of 1.10-1.20 and a trip current per unit area of the device of 0.65-0.75 A/mm².

17. The surface-mountable over-current protection device of claim 1, wherein after being put in a high temperature and high humidity environment 65° C./90% for 336 hours, the surface-mountable over-current protection device has a resistance recovery $R_{o\%}$ of 1.00-1.10 and a trip current per unit area of the device of 0.65-0.75 A/mm².

18. The surface-mountable over-current protection device of claim 1, wherein after being put in a high temperature and high humidity environment 85° C./85% for 336 hours, the surface-mountable over-current protection device has a resistance recovery $R_{o\%}$ of 0.85-1.00 and a trip current per unit area of the device of 0.75-0.80 A/mm².

* * * * *